United States Patent [19]

Nall et al.

[11] Patent Number: 4,483,522

[45] Date of Patent: Nov. 20, 1984

[54] ADJUSTABLE MANDREL FOR SUPPORTING TUBULAR WORKPIECES

[75] Inventors: Lawson H. Nall, Folsom; Richard E. Miller, Citrus Heights, both of Calif.

[73] Assignee: Tri Tool Inc., Rancho Cordova, Calif.

[21] Appl. No.: 406,540

[22] Filed: Aug. 9, 1982

[51] Int. Cl.³ .......................................... B65H 75/24
[52] U.S. Cl. ................................................. 269/48.1
[58] Field of Search ........................ 269/48.1, 71, 82; 242/72.1; 83/187; 279/2 R; 82/4 C, 4 R, 44

[56] References Cited

U.S. PATENT DOCUMENTS

| | | | |
|---|---|---|---|
| 3,030,135 | 4/1962 | Polanski | 269/82 |
| 3,089,478 | 5/1963 | Jones | 269/82 |
| 3,822,837 | 7/1974 | Celebonovic | 242/72.1 |
| 4,257,289 | 3/1981 | Groothius | 82/4 C |
| 4,397,202 | 8/1983 | Mayfield et al. | 82/4 C |

FOREIGN PATENT DOCUMENTS 1240158  9/1959  France ........................ 269/48.1

Primary Examiner—Robert C. Watson
Attorney, Agent, or Firm—Bacon & Thomas

[57] ABSTRACT

A mandrel for fixedly supporting a tubular workpiece during a machine tool cutting operation on the end area of the workpiece includes a pivotally mounted shaft that engages the workpiece and is mounted so as to be angularly adjustable relative to the central body of the mandrel. The angular adjustment of the shaft permits cutting operations to be performed on the end of the tubular workpiece in planes that are offset from a plane that is perpendicular to the centerline of the workpiece. The shaft is constrained to move solely within a single plane about a pivot center located adjacent the end of the workpiece on which a cutting operation is to be performed. The mandrel assembly is geometrically proportioned so that the pivot center of the mandrel shaft can be located in the cutting plane of a machine tool with which the mandrel is intended to cooperate.

9 Claims, 4 Drawing Figures

ADJUSTABLE MANDREL FOR SUPPORTING TUBULAR WORKPIECES

BACKGROUND OF THE INVENTION

1. Field of the Invention

This invention relates to mandrels for holding tubular workpieces during machine tool cutting operations performed on the end areas of the workpieces.

2. Description of Prior Art

This invention relates to an improved mandrel construction intended to permit precise beveling, circumferential cutting, scoring, or other similar operations on the end areas of tubular workpieces in planes that are inclined relative to a plane that is perpendicular to the centerline axis of the workpiece. Stated differently, the mandrel of the present invention enables angular adjustment between the cutting axis of the machine tool and the centerline axis of the tubular workpiece.

Prior art mandrels used heretofore are generally arranged to precisely hold a tubular workpiece so that its centerline axis coincides with the cutting axis of the machine tool used to perform a cutting operation on the end area of the workpiece, or circumferentially about the outer surface of the workpiece. Provisions are not usually made in the prior art to transversely pivot the mandrel or the workpiece relative to the cutting axis of the machine tool, since to do so would introduce inaccuracies in the cutting operation unless the mandrel was specifically designed for precise pivotal motion while maintaining tool accuracy and cutting performance. This has been so, even though it has been recognized that it would be highly desirable to perform a beveling or other cutting operation on the end of a tubular workpiece in a plane that is inclined relative to the plane that is perpendicular to the centerline axis of the workpiece. For convenience, such a cutting procedure is referred to as a "miter cut".

The mandrel according to the present invention is intended to enable such "miter" cuts to be made on tubular workpieces, generally in preparation for a welding operation involving the end area of the workpiece. Such cuts are made by tools called pipe or tube "end prep" tools, which is a short expression for "end preparation" tools. Tools of this type are conventional, and typical examples of a beveling tool can be observed, with a specific mandrel configuration, in U.S. Pat. No. 3,229,555. A typical example of a tube cut-off tool can be seen in U.S. Pat. Nos. 587,093, 1,115,277 and 1,985,541. Still another example of a tube end "milling" tool can be seen in U.S. Pat. No. 1,972,022, which also features a typical, non-adjustable angle mandrel arrangement.

While mandrels used in such applications are typically "fixed" against angular or pivotal motion, it has nevertheless been recognized in the field that it would be highly desirable to support a workpiece at an angle relative to the cutting axis of the tool so that "miter" cuts can be made to allow for slight angular differences between tubular workpieces being welded together end-to-end. The present invention is intended to provide such a mandrel that permits miter cuts to be made on tubular workpieces while preserving total overall performance and accuracy of the cutting operation.

BRIEF DESCRIPTION OF THE INVENTION

The present invention contemplates a mandrel for supporting a tubular workpiece in various angular positions relative to the cutting plane of a tube end preparation or cutting tool. The mandrel includes a mandrel shaft that extends along the mandrel axis beyond the central body of the mandrel. The mandrel shaft includes a workpiece engaging and securing mechanism near its distal end and the shaft is connected to the central mandrel body by a pivot connection that strictly limits the pivotal movement of the shaft to pivotal motion within a single plane about a pivot center located on the longitudinal centerline of the central mandrel body. The pivot center is located on the longitudinal centerline of the mandrel body at the same location as the workpiece engaging mechanism so that the end of the workpiece is supported in the same transverse plane that intersects the pivot center. In this manner, the workpiece can be pivoted about the pivot center by pivoting the shaft with respect to the central body, without compromising performance of the cutting tool or introducing inaccuracies during the cutting operation.

In practice, the pivot center of the mandrel is ideally located at the plane of cutting action of the tool, which tool usually utilizes an orbiting cutter bit traveling in the cutting plane of the tool. The cutting plane normally will be perpendicular to the longitudinal axis of the central body of the mandrel when the mandrel is properly assembled to the cutting tool.

The connection between the shaft and the mandrel central body preferably is through a pair of abutting annular washers that slide against each other along circular or spherical surfaces having their centers of curvature located at the pivot center, whereby thrust loads along the shaft axis are fully accommodated through the pivot connection, while the pivotal movement of the shaft always occurs about its pivot center. The shaft is locked in any desired angular position on the mandrel body by a locking nut and friction plate assembly that cooperates with the mandrel body through bearing "flats" (planar bearing surfaces) extending parallel to the plane of pivotal motion of the shaft, whereby pivotal movement of the shaft is strictly limited to pivotal motion within a single plane about the pivot center of the mandrel.

The invention will be readily apparent from a consideration of the following description of a preferred embodiment thereof.

DETAILED DESCRIPTION

Figure 1:
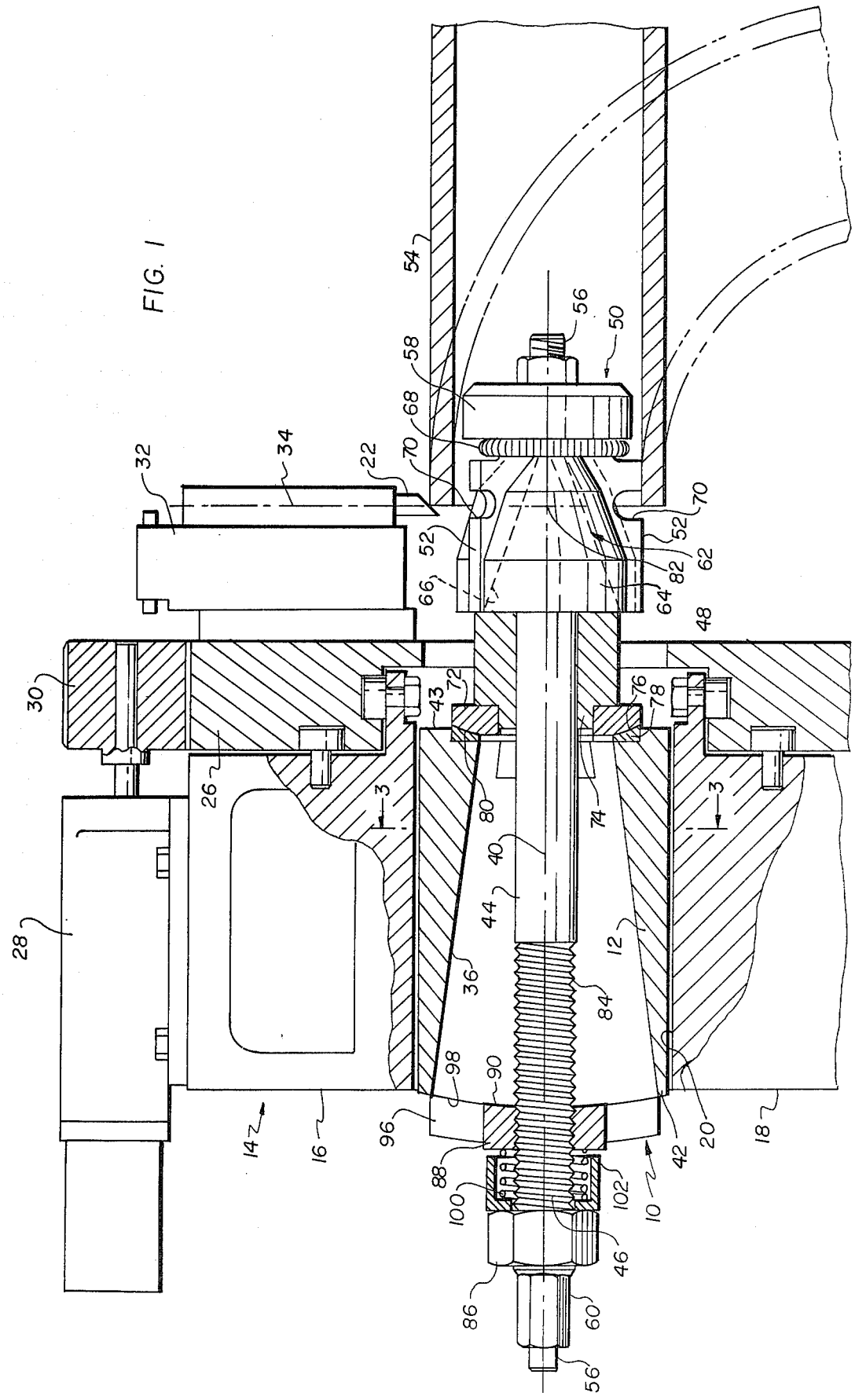
FIG. 1 is a vertical longitudinal section view of a preferred embodiment of a mandrel made in accordance with the present invention and showing a side elevation view of a typical tube end preparation tool with which the mandrel is adapted to cooperate.

With reference to FIG. 1, a mandrel 10 constructed in accordance with the present invention includes a central body 12 that preferably is cylindrical in form, although the body 12 could be constructed to have other geometrical configurations. The central body 12 is adapted to cooperate with a typical tube end preparation tool such as a tool 14 that comprises split housing halves 16, 18 through which extends a central bore 20 that normally accommodates a pipe or tube workpiece upon which a machining operation (e.g., cutting, beveling, etc.) by means of an orbiting cutter element 22 is to be performed. Such a tool is typically called a "tube end preparation tool" or "tube cut-off tool", depending upon the particular operations the tool is intended to perform.

To enable a better understanding of how the mandrel of the present invention cooperates with a typical tube end preparation or cut-off tool, a brief description of the tool 14 is in order. Essentially, the main body of the tool may be split as shown at 16, 18 to enable the tool to be mounted about a continuous pipe or tube without requiring the tool to be advanced to the cutting position from a free end of the tubular workpiece. However, it is not necessary that the housing of the tool be split or divided into multiple segments, and many tools of this type are simply formed from a single assembly having a central bore 20 extending therethrough. A tubular workpiece is normally inserted within the central bore 20 and secured in place by locking screws such as shown at 24. The locking screws are radially advanced into engagement with the outer diameter of the tubular workpiece and secure same centrally within the bore 20. The body of the tool 16, 18 is normally held in fixed position. A rotating tool carrier 26 in the form of an annular plate is supported on the front of the main body 16, 18 and is driven by a motor 28 through a pinion gear 30 that engages gear teeth on the periphery of the tool carrier 26. A tool bit holder 32 is secured to the face of the tool carrier 26 so that the holder 32 orbits about an orbital axis of the tool 14, conventionally referred to as the tool "cutting axis". The cutter tool bit element 22 is secured to its holder 32 by any conventional arrangement that precisely locates the cutter bit 22 relative to a workpiece normally secured within the bore 20. Suitable feed means are normally provided for controlling the radial feed position of the cutter bit 22 so that it may be controllably advanced into engagement with a workpiece or selectively withdrawn therefrom. The cutter element 22 orbits within a single transverse plane 34 which, for convenience, is referred to as the "cutting plane".

Typical prior art pipe or tube cutting tools of the type described above with reference to the tube end preparation tool 14 can be seen in U.S. Pat. Nos. 587,093, 1,115,277 and 1,985,541. The cutting tool 14 itself does not constitute part of the present invention, but is illustrated to show a typical cutting tool with which the mandrel 10 is adapted to cooperate. Although tools of this type normally are designed to engage a tubular workpiece within the central bore 20 of the tool, the mandrel 10 is located in the bore for the illustrated application, and secures a workpiece outside the bore. However, the mandrel 10 also could be utilized with a portable tube end preparation tool that normally accommodates a single position mandrel within a central bore of the tool. The prior art tube end preparation tools of this configuration can be seen in U.S. Pat. Nos. 1,674,372, 1,972,022 and 3,229,555. In accordance with the latter type of tools, the workpiece is conventionally held at the distal end of the mandrel by workpiece engaging elements that radially expand into engagement with the inner diameter of a tubular workpiece for holding same in fixed position relative to the cutting plane of the tool.

While the mandrel of the present invention is preferably adapted to operate with the former type of tube end preparation or cutting tool, it will be understood that this is exemplary only and that the invention resides in the particular configuration of the mandrel itself and in the manner in which it is adapted to adjust the position of the tubular workpiece relative to the cutting plane of the tool whereby the central axis of the workpiece can be inclined relative to the cutting axis of the tool. Such an arrangement permits a bevel to be placed on the end of a tubular workpiece in a plane that is inclined slightly from a direction that is normal to the longitudinal axis of the workpiece. Such cuts are highly desirable when pipes are being prepared in the field so that slight misalignments between pipe sections can be accommodated at a welded joint. Such an eccentric "cut" is particularly desirable when the ends of elbow sections of tubes or pipes are being prepared for welding to permit the elbow to be accurately welded in position even though the pipe or tube sections on either side of the elbow are not precisely located at the precise angular relationship corresponding to the angle of the elbow to be welded to the pipe or tube sections.

The mandrel of the present invention, accordingly, is particularly adapted to permit a "miter cut" to be performed on the end of a tubular workpiece that may be a straight or elbow segment. In accordance with the invention, the central body 12 includes the longitudinal opening 36 extending therethrough in a plane that includes the longitudinal axis 40 of the central body 12. The longitudinal opening 36 extends through the rearward or proximal end 42 of the central body 12 and also through the forward or distal end 43. While the opening is shown as extending entirely through the central body 12, it will be apparent that it does not necessarily need to extend through the rearward end 42 of the central body 12, but it is preferred to form the opening 36 in such a manner so as to accommodate a mandrel shaft 44 that extends entirely through the opening 36 and projects beyond the proximal and distal ends 42, 43 of the central body 12. The shaft 44 terminates at proximal and distal end areas 46, 48, respectively.

A workpiece holder 50 is provided at the distal end area 48 of the shaft 44. The workpiece holder includes longitudinally and radially movable blade elements 52 that are radially moved outwardly into engagement with the interior of a tubular workpiece 54 which, as illustrated, may be a straight or elbow section. The blades 52 are selectively movable into engagement with the inner diameter of the workpiece 54 by means of an axially movable draw bar 56 that preferably extends entirely through shaft 44. An enlarged draw bar head 58 is axially moved by rotation of workpiece locking nut 60 shown at the left of FIG. 1. Rotation of the nut 60 causes the draw bar 56 to advance to the left as shown in FIG. 1, carrying with it the head 58 that engages the ends of blades 52.

The blades 52 are disposed within slots 62 of enlarged mandrel head 64 located at the distal end area 48 of shaft 44. The slots 62 project generally radially inwardly a selected depth within the head 64 and terminate at inclined surfaces 66 against which the blades 52 rest. A spring 68 is utilized to hold the blades 52 within the slots 62 of mandrel head 64. Movement of the draw bar head 58 to the left causes the blade 52 to ride up inclined surfaces 66 and radially expand into engagement with the inner diameter of a workpiece 54.

Each mandrel blade 52 is provided with an undercut opening 70, the purpose of which will become evident during the description below of the pivotal connection between the shaft 44 and the central body 12.

The shaft 44 is connected to the central body 12 in a unique manner permitting longitudinal axis of the shaft 44 to be inclined relative to the longitudinal axis 40 of the central body 12. Keeping in mind that the mandrel constructed according to the present invention must be extremely rugged to withstand the rigors of repeated and continuous machining operations on relatively large workpieces, it is absolutely necessary that the shaft 44 be supported within the central body 12 in a manner whereby undesired motion of the shaft 44 is absolutely prevented during cutting operations. On the other hand, the purpose of the mandrel is to enable miter cuts to be performed on workpieces and this necessitates a provision for adjusting the angular position of the shaft 44 relative to the central body 12. These two objectives are accomplished by means of the connection between the shaft 44 and central body 12 in accordance with this invention.

Specifically, an annular washer element 72 is connected to the shaft 44 by means of a spacer element 74 that holds washer 72 axially in position relative to the mandrel head 64. It should be observed that the washer element 72 could be attached to the shaft 44 in any other desired manner that would precisely locate the washer element 72 axially along the shaft 44 at the precisely desired location. The washer element 72 includes a circular or spherically curved bearing surface 76 on its rearward face (towards the left in FIG. 1). A second annular washer element 78 is mounted on the central body 12 and includes another circular or spherical bearing surface 80 that is normally contiguous to bearing surface 76 on washer 72. The two surfaces 76, 80 accordingly are relatively slidable and contiguous to provide a pivot bearing connection between shaft 44 and central body 12. An important feature of the invention is that the center of pivoting motion 82 of shaft 44 is located adjacent the distal end area 48 of the shaft 44 at a location along longitudinal axis 40 of central body 12 representing the intersection point between the longitudinal axis 40 and the cutting plane 34 of a tool with which the mandrel is adapted to cooperate. Naturally, it will be evident that the precise location of the pivot center 82 along axis 40 will be adjusted by shifting the mandrel central body 12 so that it will be precisely located in the cutting plane 34 during any machining operation. Insofar as the construction of mandrel 10 is concerned, the only requirement is that the shaft 44 be sufficiently long to enable the pivot center 82 to be located in the cutting plane of a tool with which the mandrel is associated. In all instances, the pivot center will be located adjacent the shaft distal end at the location of the workpiece engaging and holding elements, in this case the blades 52, so that the workpiece can be positioned in the cutting plane of the tool and pivoted about the pivot center while it is in the cutting plane.

The shaft 44 is constrained to pivot about pivot center 82 by forming the curved bearing surfaces 76, 80 so they are concentric about the pivot center 82. Thus, lateral motion of shaft 44 is limited to pivotal movement about the pivot center 82 as contiguous bearing surfaces 76, 80 slide relative to each other to accommodate the pivotal motion while restraining axial motion of the shaft 44 in a direction towards the left in FIG. 1.

Pivotal motion of shaft 44 is constrained so that it can only occur in a single plane that includes longitudinal axis 40. This is accomplished in the following manner.

Figure 2:
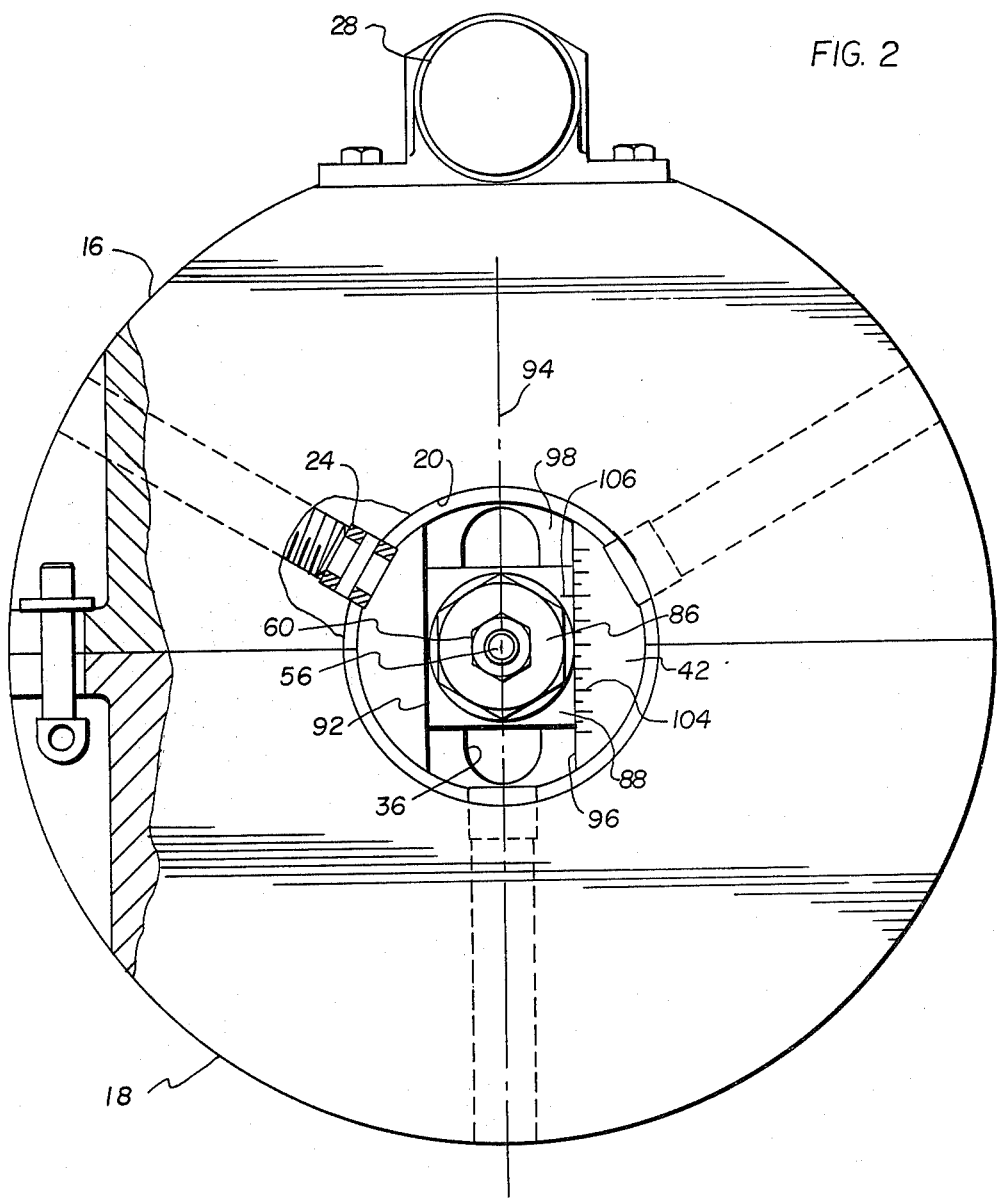
FIG. 2 is a left end view of FIG. 1.
Figure 3:
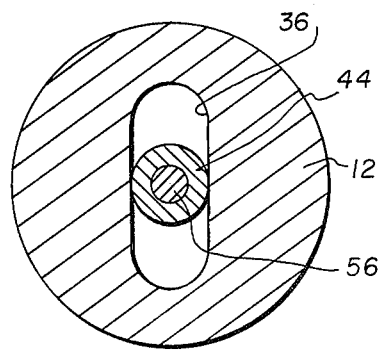
FIG. 3 is a detail section view taken along line III—III of FIG. 1.

The proximal end of shaft 44 is provided with external helical threads 84 to which is threadedly engaged a shaft locking nut 86. A friction plate 88 is slidably mounted to the proximal end of the shaft 44 adjacent the locking nut 86 and includes a circular curved cam surface 90 having a center of curvature at the pivot center 82. The friction plate 88, as seen in FIG. 2, includes flat, planar parallel surfaces 92 on opposite sides thereof, the "flats" 92 extending parallel to the desired plane 94 of pivotal motion of shaft 44. It will be noted, incidentally, from FIG. 2 that the preferred shape of the longitudinal opening 36 in central body 12 is elongated along the pivoting plane 94 to preserve as much material within central body 12 as is reasonably possible.

The proximal end 42 of central body 12 is also provided with a set of flat surfaces or "flats" 96 that are contiguous with flats 92 on friction plate 88. The friction plate 88, of course, closely fits around the diameter of shaft 44, and it will therefore be evident that the shaft 44 can only move within the plane 94 due to the restraining action of flats 92, 96 which prevent lateral motion outside of plane 94.

The proximal end 42 of central body 12 is also provided with a cam follower surface 98 against which the cam surface 90 of friction plate 88 rests. The cam and cam follower surfaces 90, 98 ensure that, when the shaft 44 is locked into position, it will be axially pulled along an axis that intersects the pivot center 82.

To lock the shaft 44 into position, or to adjust its pivotal position relative to central body 12, the friction plate 88 must be axially forced to the right in FIG. 1, or towards the distal end of shaft 44. This is achieved by advancing the nut 86 towards the friction plate 88 and locking the plate 88 firmly against the proximal end 42 of central body 12. In this position, the cam and cam follower surfaces 90, 98 on friction plate 88 and central body 12, respectively, are firmly purged against each other to frictionally lock the shaft 44 to the central body 12. This action also locks the shaft against rotation, although any other suitable means to lock the shaft against rotation could be utilized.

Preferably, a spring 100 and an enclosing spacer washer 102 may be utilized between the shaft locking nut 86 and the friction plate 88, whereby the friction plate 88 is continuously urged into engagement with the proximal end 42 of the central body 12. This enables the entire shaft and central body assembly to be held in axially assembled position when nut 86 is backed away from the friction plate 88 when adjustment of the position of shaft 44 is being made. The spring 100, moreover, continuously urges the washer elements 72, 74 at the distal end of shaft 44 into engagement with each other so that the shaft 44 is continuously restrained against any other motion except pivoting motion in plane 94 about pivot center 82.

If desired, indicator marks 104 may be provided on the proximal end 42 of central body 12 which, in cooperation with an index mark 106 on friction plate 88 will present a visual indication of the angle of inclination of shaft 44 relative to central body 12 about pivot center 82.

Figure 4:
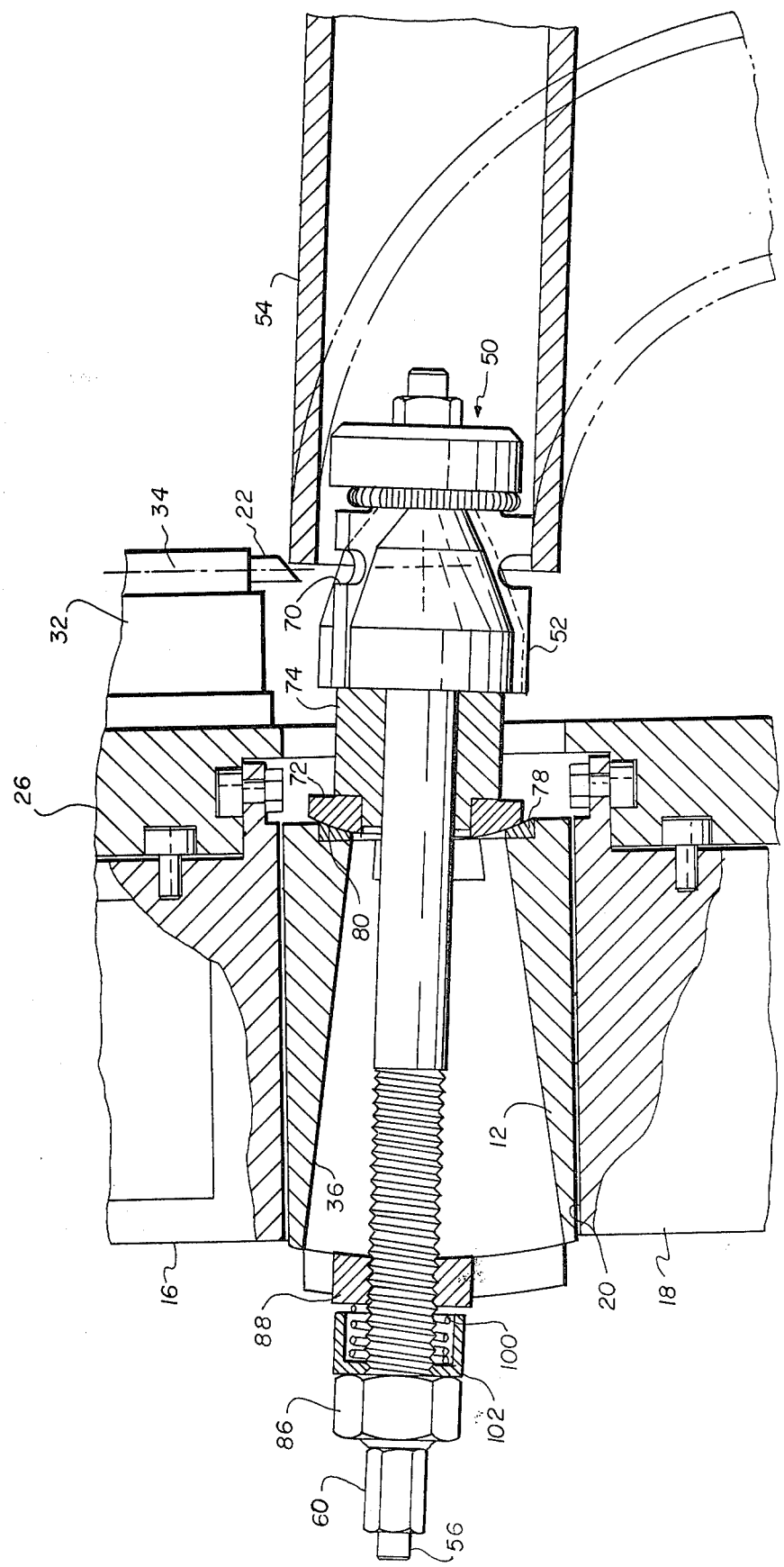
FIG. 4 is a detail view showing the mandrel holding a workpiece in pivoted position.

By comparing FIGS. 1 and 4, the operation of mandrel 10 will be readily apparent. In practice, it is usually only desired to incline the tubular workpiece on the order of 2° to 5° relative to the cutting plane of the cutting tool with which the mandrel 12 is being used. Thus, as a practical matter, the range of pivotal movement of shaft 44 relative to the longitudinal axis of the mandrel 12 need only be 5° to 8° on either side of the central axis of the mandrel. The mandrel 12 is normally located within a cutting tool 14 so that the pivot center 82 coincides with the cutting axis 34 of the tool.

Since a typical cutting operation performed on the end of a tubular workpiece necessitates feeding of a cutter bit 22 into a position that may be radially inward of the inner diameter of the tubular workpiece, it is preferred that undercut openings 70 be provided on the mandrel blades 52 at a position lying in the transverse plane intersecting the pivot center 82. Thus, when the mandrel 10 is properly placed within the bore of a cutting tool, the pivot center 82 and the openings 70 are aligned with a cutter bit 22 within the cutting plane 34. A workpiece 54, which may be straight or curved, is engaged on its inner diameter by the radially expanded blades 52 that have been moved into such position by turning the nut 60 on the draw bar 56. The central body 12 is rotated within the tool 14 so that the plane 94 of pivotal motion of shaft 44 is in a desired orientation that will depend upon the nature of the cut to be performed on the workpiece 54. After the operator has determined the angle of inclination of the cut to be performed on the workpiece 54 relative to its centerline axis, the workpiece is pivoted about the pivot center 82 by pivoting the shaft 44 and locking it in the desired position by advancing the shaft locking nut 86 to cause the friction plate 88 to secure the shaft 44 relative to the central body 12. Due to the nature of the connection between the shaft 44 and the central body 12, the pivotal movement of shaft 44 will always occur about the pivot center 82 so that the workpiece 54 in all instances will be precisely angled at its line of intersection with the cutting tool bit 22.

Upon rotation of the tool carrier 32 by motor 28, the cutter bit 22 will circumscribe the workpiece 54 or engage its end to perform a beveling, cutting or scoring operation, whichever is preferred. The undercut opening 70 in blades 52 will accommodate advancement of the cutter tool bit 22 radially inwardly of the inner diameter of the workpiece 54 without intereference with the blades 52. Thus, the workpiece 54 can be beveled or cut in a plane that is inclined relative to a plane extending normal to the centerline axis of the workpiece in a precise manner by means of the mandrel of the present invention.

Various structural modifications to the general configuration of the mandrel embodiment illustrated and described herein can be made by persons skilled in the art within the spirit and scope of the invention, which is evident from the foregoing description of the preferred embodiment, the drawings and the following claims.

We claim:

1. A mandrel for adjustably holding a tubular workpiece during a tube end preparation machining procedure utilizing a cutting tool including a cutter element movable about a circular orbital path in a cutting plane, the tool and cutter element arranged to cooperate with the mandrel, comprising:

a central body extending along a longitudinal axis and including a longitudinal opening therein terminating at the forward end of the body, said opening lying in a common plane with said longitudinal axis, said central body adapted to be engaged by and secured in fixed position relative to a tool with which the mandrel is to cooperate so that said mandrel longitudinal axis intersects a cutting plane of such tool;

a shaft extending through said opening and terminating at a distal end disposed forwardly of the central body;

a workpiece holder means adjacent the distal end of said shaft, said holder means movable between workpiece holding and release positions;

means for actuating the workpiece holder means to and from its workpiece holding and release positions;

pivot connection means for connecting said shaft to said central body, said pivot connection means arranged to permit said shaft to pivot about a pivot center located adjacent its distal end on said longitudinal axis of said central body at the location on said axis of said workpiece holder means, the geometry of said central body and shaft enabling said pivot center to be disposed at an intersection point between said longitudinal axis of said central body and a cutting plane of a tool with which the mandrel is adapted to cooperate.

motion limiting means associated with the central body and shaft for preventing motion of said shaft relative to said central body except pivotal motion about said pivot center within a single plane including said longitudinal axis;

locking means for releasably securing said shaft against pivotal motion.

2. A mandrel as claimed in claim 1, said pivot connection means comprising a pair of contiguous elements each respectively connected to said central body and shaft, said contiguous elements abutting each other along circular or spherical curved sliding bearing surfaces having a common center of curvature located at said pivot center.

3. A mandrel as claimed in claim 2, said contiguous elements being annular in shape; the contiguous element connected to the central body disposed generally concentrically with said longitudinal axis of said central body; the contiguous element connected to said shaft disposed generally concentrically with respect to said shaft; said contiguous elements both being located at the front end area of said longtitudinal opening in said central body.

4. A mandrel as claimed in claim 1, said motion limiting means comprising cooperating contiguous flats extending parallel to said plane of pivotal motion of the shaft, the flats disposed on or connected to the exterior of the shaft and disposed on or connected to the central body for constraining pivotal motion of the shaft to said single plane.

5. A mandrel as claimed in claim 4, said opening extending entirely through the central body; said shaft extending entirely through said opening and including a proximal end extending rearwardly of a rearward end of the central body; said proximal end area of said shaft being helically threaded; said locking means for said shaft comprising a locking nut threaddedly engaged to the proximal end area of said shaft; a friction plate slidable longitudinally along the proximal end area of the shaft and engageable by the locking nut for advancement to a locking position from a release position; said friction plate contacting the rearward end area of said central body to frictionally clamp the shaft to the central body when said plate is advanced by said locking nut into locking position.

6. A mandrel as claimed in claim 5, said flats disposed on or connected to said shaft being associated with said friction plate.

7. A mandrel as claimed in claim 6, said rearward end area of said central body including a circular curved cam surface, the center of curvature of said cam surface coinciding with said pivot center; said locking plate including a cam follower surface extending parallel with and facing said cam surface; said cam and cam follower surfaces frictionally engaging each other when said friction plate is advanced into locking position.

8. A mandrel as claimed in claim 7, including a compression spring between said locking nut and said friction plate to bias the friction plate and nut longitudinally apart from each other, whereby the cam and cam follower surfaces are biased together when the locking nut is initially rotated towards a release position from a locking position.

9. A mandrel as claimed in claim 1, said workpiece holder comprising radially movable blade elements for engaging the interior of a tubular workpiece, said blade elements extending parallel to said longitudinal axis of the central body and including undercut openings in their radially outer edges, said undercut openings intersecting a transverse plane extending perpendicular to said longitudinal axis and intersecting said pivot center.

* * * * *